United States Patent
Kawamura et al.

(10) Patent No.: US 11,879,879 B2
(45) Date of Patent: Jan. 23, 2024

(54) SPECTRUM DATA PROCESSING DEVICE

(71) Applicant: SHIMADZU CORPORATION, Kyoto (JP)

(72) Inventors: Kazuhiro Kawamura, Kyoto (JP); Yukihiko Kudo, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 634 days.

(21) Appl. No.: 16/473,716

(22) PCT Filed: Jan. 30, 2017

(86) PCT No.: PCT/JP2017/003134
§ 371 (c)(1),
(2) Date: Jun. 26, 2019

(87) PCT Pub. No.: WO2018/138901
PCT Pub. Date: Aug. 2, 2018

(65) Prior Publication Data
US 2021/0132013 A1 May 6, 2021

(51) Int. Cl.
G01N 30/86 (2006.01)
G01N 30/72 (2006.01)
G01N 27/623 (2021.01)

(52) U.S. Cl.
CPC ....... *G01N 30/8686* (2013.01); *G01N 27/623* (2021.01); *G01N 30/7206* (2013.01); *G01N 30/8679* (2013.01)

(58) Field of Classification Search
CPC .......... G01N 30/8686; G01N 30/7206; G01N 30/8679; G01N 27/623
See application file for complete search history.

(56) References Cited

U.S. PATENT DOCUMENTS

| 2008/0033663 | A1* | 2/2008 | Brown | G01N 21/65 |
| | | | | 702/28 |
| 2011/0012016 | A1* | 1/2011 | Maier | G16B 40/10 |
| | | | | 250/282 |

(Continued)

FOREIGN PATENT DOCUMENTS

| JP | 2000-206103 A | 7/2000 |
| JP | 2006-038628 A | 2/2006 |

(Continued)

OTHER PUBLICATIONS

Written Opinion for PCT/JP2017/003134, dated Apr. 25, 2017.

(Continued)

*Primary Examiner* — Ricky Go
(74) *Attorney, Agent, or Firm* — Sughrue Mion, PLLC

(57) ABSTRACT

A mass spectrum generation section (22) generates an original mass spectrum at a peak of a target compound based on data acquired through analysis on a sample. A background spectrum generation section (23) generates a background spectrum in accordance with each of a plurality of predetermined background acquisition conditions. A difference mass spectrum calculation section (25) obtains a difference mass spectrum by subtracting the each background spectrum from the original mass spectrum, and a spectrum similarity calculation section (27) calculates a similarity between each difference mass spectrum and a standard mass spectrum of a candidate compound selected from a spectrum library (28). A compound identification section (29) identifies the candidate compound as the target compound if the highest similarity exceeds a predetermined threshold.

5 Claims, 4 Drawing Sheets

(56) References Cited

U.S. PATENT DOCUMENTS

| | | | | |
|---|---|---|---|---|
| 2011/0049353 A1* | 3/2011 | Gilbert | .................... | H01J 49/00 |
| | | | | 250/282 |
| 2011/0202282 A1* | 8/2011 | Kostrzewa | ............. | G16B 50/00 |
| | | | | 702/19 |
| 2011/0246414 A1* | 10/2011 | Klepel | ................. | G01N 27/622 |
| | | | | 706/54 |
| 2014/0183353 A1* | 7/2014 | Shimada | ............... | H01J 49/022 |
| | | | | 250/282 |
| 2015/0211042 A1* | 7/2015 | Franzen | ................... | C12Q 1/04 |
| | | | | 702/19 |
| 2015/0340216 A1* | 11/2015 | Kwiecien | ........... | G06K 9/00543 |
| | | | | 250/282 |

FOREIGN PATENT DOCUMENTS

| | | | |
|---|---|---|---|
| JP | 201966338 | * | 4/2019 |
| WO | 2016/142692 A1 | | 9/2016 |

OTHER PUBLICATIONS

International Search Report for PCT/JP2017/003134, dated Apr. 25, 2017.

Communication dated Feb. 1, 2021, issued by the State Intellectual Property Office of People's Republic of China in application No. 201780085101.5.

* cited by examiner

DATA ABOUT TARGET SAMPLE

DATA ABOUT BLANK SAMPLE

MASS SPECTRUM AFTER SUBTRACTION

SPECTRUM DATA PROCESSING DEVICE

CROSS REFERENCE TO RELATED APPLICATIONS

This Application is a National Stage of International Application No. PCT/JP2017/003134 filed Jan. 30, 2017.

TECHNICAL FIELD

The present invention relates to a spectrum data processing device that processes spectra data obtained in a sample measuring device, such as a mass spectrometer, an absorption spectrometer, or a fluorescent X-ray spectrometer, and more particularly relates to a spectrum data processing device that identifies a compound in a sample using a spectrum.

BACKGROUND ART

Identification of a compound in a sample using mass spectrometry is generally achieved by library search using a spectrum library storing standard mass spectra of various compounds. Generally, in the library search, a similarity in spectrum pattern between an actually measured mass spectrum and a standard mass spectrum of each of the various compounds stored in the spectrum library is calculated. The actually measured mass spectrum is obtained by performing mass spectrometry on a sample including an unknown compound that is a target of identification. Then, the calculated similarity is compared with a predetermined threshold, or similarities of a plurality of candidate compounds are compared with each other, and then a compound corresponding to the most probable standard mass spectrum is estimated as the unknown compound.

For a sample including a plurality of compounds, GC-MS or LC-MS is used that is a combination of the mass spectrometer and a gas chromatograph (GC) or a liquid chromatograph (LC). However, this solution is plagued by a background superimposed on a mass spectrum of the target compound. The background corresponds to a mass spectrum derived from another compound (including contaminants). This occurs when the plurality of compounds cannot be completely separated from each other or the contaminants are eluded at the same time point as the target compound. When the actually measured mass spectrum under an unignorable influence of the background spectrum is used for the library search, the accuracy of the compound identification is compromised. In this context, Patent Literature 1 discloses conventionally known background removal processing.

A device described in Patent Literature 1 executes processing of subtracting a background spectrum from an original mass spectrum at around a point (retention time) corresponding to the peak of a target compound. A mass spectrum obtained in a time range with no peak of the target compound on a chromatogram is regarded as the background spectrum. The time range with no peak of the target compound on the chromatogram includes, for example, a predetermined time range before the starting point of the peak of the target compound, and a predetermined time range after the end point of the peak of the target compound. Such processing is effective for removing a background spectrum due to contaminants anticipated to be appearing substantially uniformly over the entire eluting time, such as contaminants mixed in a mobile phase.

However, the processing is not suitable for removing a background spectrum derived from another compound with the peak overlapping with the peak of the target compound. When the peak of the other compound is likely to be overlapping with the peak of the target compound, the background spectrum needs to be estimated from a mass spectrum in a time range (that is, a time range between the starting point and the end point of the peak) with the peak of the target compound appearing. In view of this, the following algorithm is conventionally used for estimating the background spectrum. Specifically, first of all, a coefficient P is calculated by $P=(tp-ts)/\Delta t$, where $tp$, $ts$, and $\Delta t$ respectively represent a peak top time point, a peak starting time point, and a peak duration of a peak of the target compound on a chromatogram. A mass spectrum is obtained by subtracting the mass spectrum at the peak end point from the mass spectrum at the peak starting point, and then is multiplied by the coefficient P. Then, a result of adding the mass spectrum thus obtained to the mass spectrum at the peak starting point ts is regarded as a background spectrum, and is subtracted from the original mass spectrum.

Patent Literature 2 discloses known background removal processing including: selecting a mass spectrum of a substance anticipated to be a contaminant overlapping with the target compound from a library; and subtracting the mass spectrum from the original mass spectrum.

As described above, various algorithms are conventionally available for calculating or estimating the background spectrum to be subtracted from the original mass spectrum. One conventional GC-MS (or LC-MS) data processing device having a function for the background removal processing executes processing of automatically determining a time range in which data used for calculating the background spectrum on the chromatogram is obtained. However, such automatic processing often leads to library search resulting in inappropriate compound identification due to a huge discrepancy between the background spectrum actually superimposed on the original mass spectrum and the estimated background spectrum resulting in a huge difference between the mass spectrum as a result of subtraction of the background spectrum and the actual mass spectrum of the target compound.

For example, in a case where the background spectrum may be calculated by averaging a plurality of mass spectra obtained in a predetermined time range before the peak starting point of the target compound, when another compound is eluded at a high concentration around the peak starting point of the target compound, the library search might result in a spectrum similarity after the background subtraction being lower than that before the subtraction.

Thus, to effectively remove the background, an optimum algorithm needs to be selected for calculating the background spectrum for each peak of the target compound, or an appropriate time range needs to be determined for obtaining data used for calculating the background spectrum. Such an optimum algorithm and time range are difficult to automatically determine, and thus in actual cases, an operator is required to visually check the waveform of a peak derived from the target compound on the chromatogram and a signal waveform around that time, to designate the appropriate algorithm and time range. Such work is extremely cumbersome, and takes so much time especially when a sample includes multiple compounds to be identified.

The issues described above for the case of GC-MS or LC-MS using the mass spectrometer similarly arise in a case of compound identification based on an absorption spectrum in an LC with a detector such as photodiode array detector (PDA detector) or an ultraviolet detector (UV detector), for example. The need for performing the background removal through derivation of an appropriate background spectrum in accordance with the current measurement condition and the like is not limited to GC or LC, and is totally relevant in a case where the compound identification is performed based on a fluorescent X-ray spectrum obtained by a fluorescent X-ray spectrometer or an infrared absorption spectrum obtained by a Fourier transform infrared spectrometer.

CITATION LIST

Patent Literature

Patent Literature 1: JP 2000-206103 A
Patent Literature 2: JP 2006-38628 A (paragraph [0005])

SUMMARY OF INVENTION

Technical Problem

The present invention is made to solve the problems described above, and is directed to providing a spectrum data processing device that can automatically perform compound identification with high reliability based on a spectrum obtained by subtracting an appropriate background spectrum, without depending on an operation or determination by an operator and the like.

Solution to Problem

A spectrum data processing device that processes spectra data obtained by performing predetermined analysis on a sample including a compound, according to the present invention for solving the problem described above, includes:
 a) a spectrum library configured to store a standard spectrum for each compound;
 b) an original spectrum generation section configured to generate an original spectrum of a target compound that is a target of identification based on spectra data obtained for a target sample;
 c) a background spectrum acquisition section configured to acquire a plurality of background spectra in accordance with a plurality of background acquisition conditions determined in advance;
 d) a difference spectrum calculation section configured to calculate a difference spectrum obtained by subtracting each of a plurality of background spectra, acquired by the background spectrum acquisition section, from the original spectrum; and
 e) a compound identification section configured to calculate a similarity between each of a plurality of the difference spectra calculated by the difference spectrum calculation section and one or a plurality of standard spectra stored in the spectrum library, and to identify the target compound by referring to a plurality of the similarities thus calculated.

Examples of the spectra data that is the target of processing by the spectrum data processing device according to the present invention include mass spectra data obtained by a mass spectrometer, absorption spectrum data obtained by a PDA detector or a UV detector, infrared absorption spectrum data obtained by a Fourier transform infrared (FTIR) spectrometer, and a fluorescent X-ray spectrum obtained by a fluorescent X-ray spectrometer. The cause of the background noise superimposed on a spectrum depends on the type of spectrometer or of spectrum data, and thus the background acquisition condition also depends on the type of spectrometer or of spectrum data.

The original spectrum generation section of the spectrum data processing device according to the present invention generates the original spectrum of the target compound that is an identification target and thus is unknown, based on the spectra data obtained for the target sample. For example, when the spectra data that is the processing target is mass spectra data repeatedly acquired over time by chromatograph mass spectrometry, the total ion chromatogram may be generated based on such data and displayed on the screen of the display section. Then, the mass spectrum at the retention time of the peak designated by the operator on the total ion chromatogram display may be generated as the original spectrum.

The background spectrum acquisition section acquires a plurality of background spectra in accordance with a plurality of background acquisition conditions determined in advance. Examples of the background acquisition condition may include which data is used as the background spectrum and how the background spectrum is generated from such data.

For example, when the spectra data that is the processing target is data obtained by the chromatograph mass spectrometry, the background spectrum acquisition section may generate the background spectrum from a part of data other than the data used for generating the original mass spectrum or from data in a wide time rage including the data used for generating the original mass spectrum. The background spectrum may be generated not based on the data obtained by performing predetermined analysis on the sampler including the target compound, and may be generated based on data obtained by performing the predetermined analysis on a blank sample that apparently does not include the target compound. A spectrum satisfying a predetermined background acquisition condition may be selected, from multiple spectra stored in the spectrum library (or another library), as the background spectrum. In any cases, a plurality of background spectra are acquired in accordance with different background acquisition conditions.

The difference spectrum calculation section calculates a difference spectrum by subtracting each of a plurality of background spectra from the original spectrum. The signal intensity of a negative value as a result of the subtraction may be set to be 0. The background spectra generated based on analysis results on different samples or acquired from the spectrum library might be different from the original spectrum in detection sensitivity. In such a case, the subtraction processing may be executed after processing such as normalizing the signal intensity value and the like for example may be executed to offset the difference in the detection sensitivity.

A difference spectrum obtained by subtracting a background spectrum with a spectrum shape close to that of the background spectrum actually superimposed on the original spectrum relatively accurately reflects the spectrum of the target compound. Logically, a difference spectrum obtained by subtracting a background spectrum with a spectrum shape clearly different from that of the background spectrum actually superimposed on the original spectrum should be largely different from the spectrum of the target compound. The compound identification section at least calculates the similarity of each of the plurality of difference spectra to one or a plurality of standard spectra stored in the spectrum library one by one.

The standard spectrum, that is, a compound for which the spectrum similarity is calculated is preferably selected as appropriate from the standard spectra stored in the spectrum library. The selection may be manually made with the operator in person selecting candidate compounds, estimated have a possibility of being the target compound, from the compounds in the spectrum library. The compound information (such as the retention time, the retention index, the mass-to-charge ratio of the monitoring ion (such as a target ion or a qualifier ion), and a qualifier ion ratio) stored in the compound information storage section associated with the spectrum library or the spectrum library may be used for automatically extracting a compound or a standard spectrum as a potential candidate from the spectrum library or the compound information storage section. Any of these configurations involving narrowing down of the targets for which the spectrum similarity is calculated can avoid the involvement of the compound that cannot be the target compound but accidentally has a high similarity to the standard spectrum.

The target ion, which is one type of the compound information, is an ion characterizing the corresponding compound, and the qualifier ion is an ion also characterizing the corresponding compound but that is different from the target ion and has a different mass-to-charge ratio. The qualifier ion ratio is a relative ratio between the signal intensity at the peak of the corresponding qualifier ion and the signal intensity at the peak of the target ion. The retention index is similar in concept to the retention time and is obtained by indexing the retention times of compounds to the retention time of a reference compound, such as a compound within the n-alkane homologue series.

The difference spectrum with a higher similarity more accurately reflects the spectrum of the target compound, and the standard spectrum involved in the calculation of the similarity is likely to be the compound corresponding to the target compound. Thus, for example, the compound corresponding to the standard spectrum from which the highest one of a plurality of similarities calculated is identified as the target compound. Thus, highly reliable compound identification can be performed without the need for the operator to designate an appropriate background acquisition condition.

The compound identification section, which calculates similarities between a plurality of difference spectra calculated by the difference spectrum calculation section and one or a plurality of standard spectra stored in the spectrum library, may further calculate the similarity between the original spectrum and one or a plurality of standard spectra to perform the compound identification by further referring to this similarity.

In a preferred aspect, the spectrum data processing device according to the present invention further includes:
an initial similarity calculation section configured to calculate a similarity between the original spectrum and the one or plurality of standard spectra stored in the spectrum library;
a similarity determination section configured to determine whether the similarity for each of the plurality of difference spectra calculated by the compound identification section is smaller than the initial similarity calculated by the initial similarity calculation section, the similarity and the initial similarity being calculated using a same one of the one or plurality of standard spectra; and
an alert notification section configured to issue an alert to an operator, when the similarity determination section determines that at least one of the similarities of the plurality of difference spectra is smaller than the initial similarity, the similarities and the initial similarity being calculated using the same one of the one or plurality of standard spectra.

In another preferred aspect, the spectrum data processing device according to the present invention further includes:
an initial similarity determination section configured to calculate a similarity between the original spectrum and the one or plurality of standard spectra stored in the spectrum library, and determines whether the similarity exceeds a predetermined threshold;
an individual similarity determination section configured to determine whether the similarity for each of the plurality of difference spectra calculated by the compound identification section exceeds the predetermined threshold; and
an alert notification section configured to issue an alert to an operator, when the initial similarity determination section determines that the initial similarity exceeds the predetermined threshold and the individual similarity determination section determines that the similarity does not exceed the predetermined threshold, the similarity and the individual similarity being calculated using a same one of the one or plurality of standard spectra.

In the two preferable aspects, the alert notification section may issue the alert to the operator through a display for example. In these aspects, the alert notification section issues the alert, when the similarity of the original spectrum, in the spectrum shape, to the standard spectrum in the spectrum library is compromised as a result of subtracting the background spectrum. Such a situation might render the background removal difficult at least under a predetermined background acquisition condition such as a case where another compound exists at a high concentration around the peak of the target compound on the chromatogram for example. Upon being notified of such a situation, the operator can set an appropriate background acquisition condition by, for example, checking the chromatogram in person or by the other like manual procedure, to implement more accurate compound identification.

Advantageous Effects of Invention

With the spectrum data processing device according to the present invention, highly reliable compound identification can be automatically implemented based on a difference spectrum as a result of obtaining subtracting an appropriate background spectrum or on an original spectrum without the background removal, without depending on an operation or determination of an operator. Thus, for example, multiple compounds in a sample can be identified efficiently with a lower work load on the operator. Furthermore, the configuration free of operation or determination by the operator can prevent the identification from fluctuating depending on how much the operator is skilled or experienced.

DESCRIPTION OF EMBODIMENTS

Figure 1:
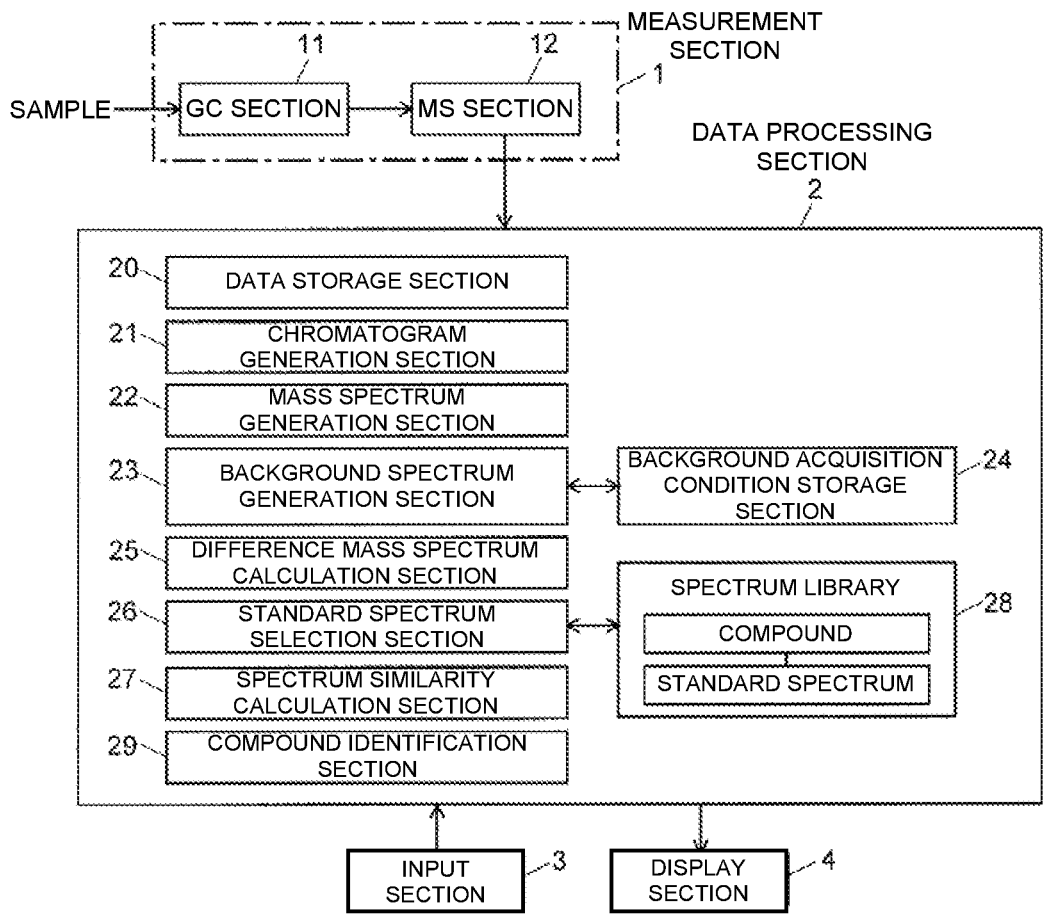
FIG. 1 is a diagram illustrating a configuration of a main part of one embodiment of a GC-MS using a spectrum data processing device according to the present invention.
Figure 2:
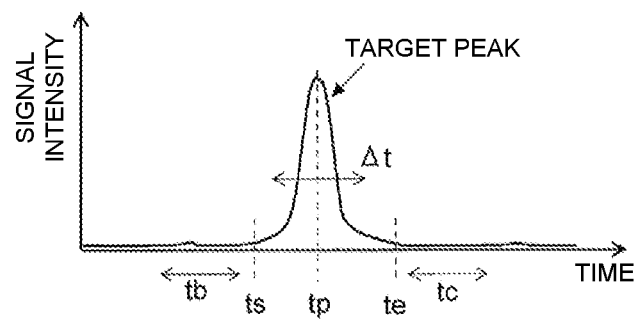
FIG. 2 is a diagram illustrating an example of a chromategram obtained in the GC-MS according to the embodiment.

One embodiment of a gas chromatograph mass spectrometer (GC-MS) including a spectrum data processing device according to the present invention is described below with reference to the attached drawings. FIG. 1 is a diagram illustrating a configuration of a main part of the GC-MS according to the present embodiment. FIG. 2 is a diagram illustrating an example of a chromatogram obtained by the GC-MS according to the present embodiment. FIGS. 3A-3D are diagrams illustrating background removal processing and compound identification processing in the GC-MS according to the present embodiment.

As illustrated in FIG. 1, a measurement section 1 includes a gas chromatograph (GC) section 11 and a mass spectrometry (MS) section 12. The GC section 11 includes unillustrated components such as a column that temporally separates compounds in a sample, a sample vaporizing chamber that is provided at an inlet end of the column and vaporizes a liquid sample so that the sample is sent into the column on a mobile phase (carrier gas), an injector that introduces a predetermined amount of the liquid sample into the sample vaporizing chamber, and a column oven for controlling the temperature of the column. The MS section 12 includes an ionization section that ionizes the compounds in sample gas as a result of passing through the column of the GC section 11, a mass separator such as a quadrupole mass filter that separates the generated ions in accordance with a mass-to-charge ratio m/z, and an ion detector that detects the ions separated in accordance with the mass-to-charge ratio. A detection signal obtained by the ion detector of the MS section 12 is input to a data processing section 2 corresponding to the spectrum data processing device according to the present invention.

The data processing section 2 includes functional blocks such as a data storage section 20 receives the detection data and stores it in a digital format, a chromatogram generation section 21, a mass spectrum generation section 22, a background spectrum generation section 23, a background acquisition condition storage section 24, a difference mass spectrum calculation section 25, a standard spectrum selection section 26, a spectrum similarity calculation section 27, a spectrum library 28, and a compound identification section 29. The spectrum library 28 stores standard mass spectra in association with compound information about various compounds (such as a compound name, chemical formula, a retention time, a retention index, a mass-to-charge ratio of a monitoring ion (such as a target ion and a qualifier ion), and qualifier ion ratio). The data processing section 2 is connected to an input section 3 and a display section 4 serving as a user interface.

The data processing section 2 may be formed of a general purpose personal computer. The functions of the functional blocks described above may be implemented with dedicated data processing software, installed in the personal computer, executed on the computer.

The GC section 11 of the measurement section 1 in the GC-MS according to the present embodiment separates various compounds in a sample in a time direction, and sends sample gas including the separated compounds to the MS section 12. The MS section 12 repeats scan measurement over a predetermined mass-to-charge ratio range at a predetermined time interval, until a predetermined measurement time elapses after a time point when the sample is introduced to the GC section 11. Each scan measurement provides mass spectrum data indicating a change in a signal intensity over the predetermined mass-to-charge ratio range. As a result of such GC/MS analysis, the data storage section 20 stores mass spectrum data obtained for each measurement time point in the predetermined time range.

Data processing for identifying an unknown target compound in a sample based on the mass spectra data collected as described above is described in detail.

A plurality of background acquisition conditions are stored in the background acquisition condition storage section 24 in advance. In this example, the following three background acquisition conditions [A] to [C] are stored.

[A] The background spectrum is determined as an average of a plurality of mass spectra obtained in a predetermined time range (a range tb in FIG. 2 for example) before a starting time point ts of the peak of the target compound.

[B] The background spectrum is determined as an average of a plurality of mass spectra obtain in a predetermined time range (a range tc in FIG. 2 for example) at an after an end time point te of the peak of the target compound.

[C] A coefficient P is calculated by $P=(tp-ts)/\Delta t$, where tp, ts, and $\Delta t$ respectively represent a peak top time point, a peak starting time point, and a peak duration of the target compound. A mass spectrum is obtained by subtracting the mass spectrum at the peak starting point ts from the mass spectrum at the peak end point te, and then is multiplied by the coefficient P. Then, the resultant mass spectrum is added to the mass spectrum at the peak starting point ts to be a background spectrum.

It is a matter of course that the background acquisition conditions are not limited to those described above, and other background acquisition conditions may be used that are different from those described above in an algorithm for generating the background spectrum and a time range in which data used for generating the background spectrum is obtained. The background acquisition condition may be determined and stored in the background acquisition condition storage section 24 in advance by a manufacturer of the apparatus, or may be determined and stored in the background acquisition condition storage section 24 as appropriate by a user that has purchased the apparatus.

For example, when an operator performs a predetermined operation on the input section 3, the chromatogram generation section 21 generates a total ion chromatogram (TIC) based on the mass spectra data over the entire measurement time stored in the data storage section 20 as described above, and displays the TIC on a screen of the display section 4. The operator checks the TIC on the screen, and designates the target peak, in peaks on the TIC, for which the compound identification is to be performed. FIG. 2 illustrates a part of the TIC, which suffices if the target peak can be designated by performing a clicking operation on a peak on the TIC using a pointing device, for example. The designation by the operator should not be construed in a limiting sense, and the compound identification may be performed completely automatically on a peak detected automatically in accordance with a predetermined algorithm on the TIC. Furthermore, an extracted ion chromatogram (mass chromatogram) of monitoring ions of candidate compounds may be used instead of the TIC.

The mass spectrum generation section 22 reads data corresponding to the time point tp of the peak top of the designated peak from the data storage section 20 to generate a mass spectrum. This serves as the original mass spectrum of the target compound (see FIG. 3A). Generally, a background spectrum due to various factors is superimposed on the original mass spectrum. Examples of the factors include contaminants derived from the mobile phase used in the GC section 11 and other compounds overlapped due to insufficient separation in the GC section 11.

The background spectrum generation section 23 reads out a plurality of background acquisition conditions stored in advance in the background acquisition condition storage section 24. Then, required data is read out from the data storage section 20 in accordance with each background acquisition condition to generate a background spectrum. Note that the background spectrum may be generated by using background acquisition conditions appropriately selected by the operator from all the background conditions stored in the background acquisition condition storage section 24, instead of using all the background acquisition conditions.

Figure 3:
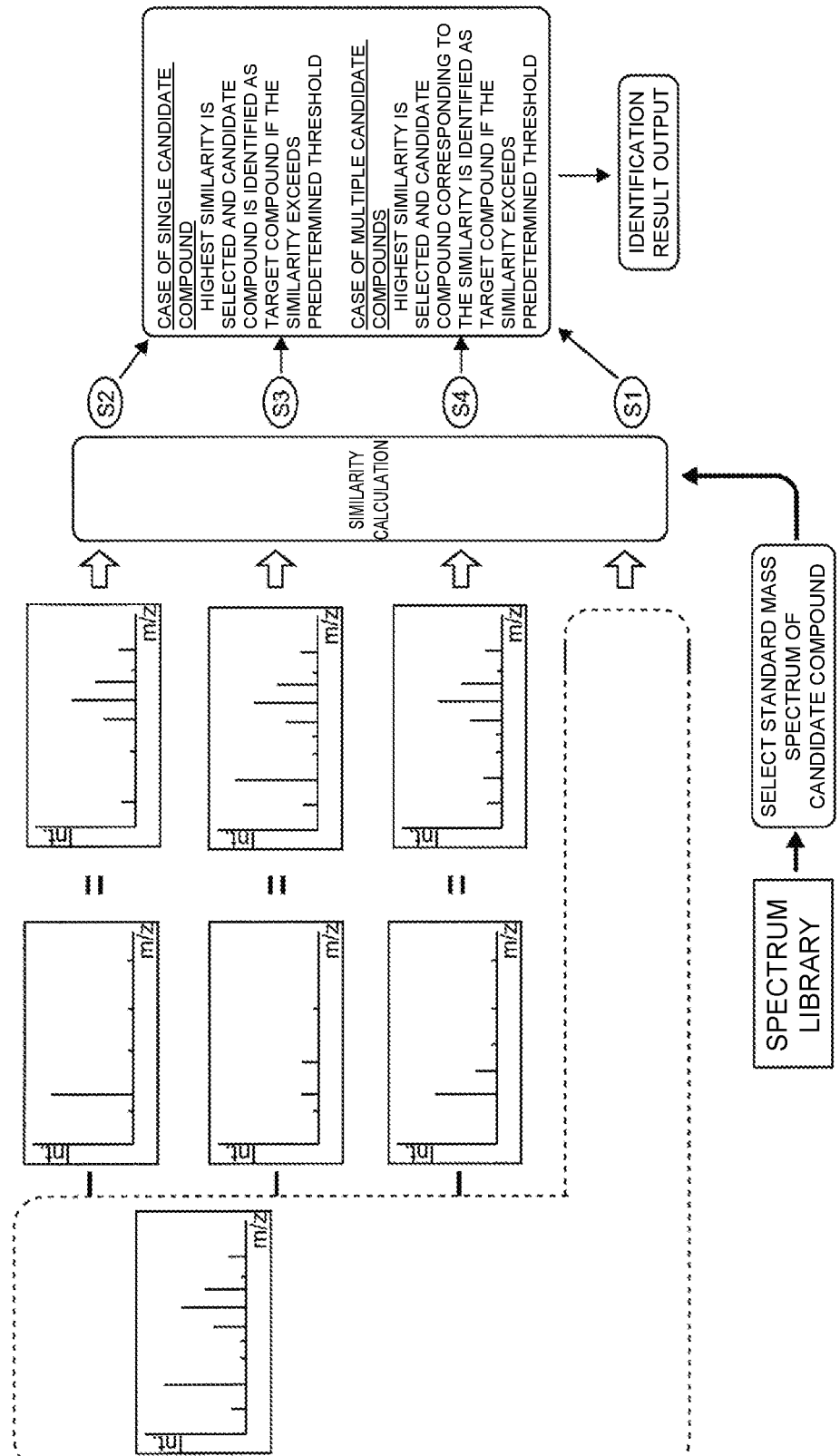
FIGS. 3A-3D are diagrams illustrating background removal processing and compound identification processing in the GC-MS according to the embodiment.

In this example, the background spectrum is generated based on each of the three background acquisition conditions [A] to [C] (see FIG. 3B). Generally, different background acquisition conditions result in background spectra with different spectrum shapes.

Next, the difference mass spectrum calculation section 25 calculates difference mass spectra as a result of subtracting each of a plurality of background spectra from the original mass spectrum of the target peak (see FIG. 3C). Subtraction processing for two mass spectra may be performed in a conventional manner. Specifically, the signal intensity may be subtracted for each mass-to-charge ratio, and the signal intensity resulting in a subtraction result of a negative value may be set to be 0. As described above, different spectrum shapes of background spectra result in calculated mass spectra with different spectrum shapes. If the background spectrum truly reflects the background superimposed on the original mass spectrum, the difference mass spectrum is simply equivalent to the mass spectrum of the target compound. Such a mass spectrum of the target compound is supposed to substantially match the standard mass spectrum corresponding to the candidate compound stored in the spectrum library 28, expect for the case where the target compound is not stored in the spectrum library 28. However, it is not very peculiar for the spectrum library 28 to store a compound that is completely different from the target compound but has a spectrum pattern that accidentally resembles that of the difference mass spectrum derived from the target compound.

Thus, the standard spectrum selection section 26 selects the standard mass spectrum (spectra) of one or a plurality of candidate compounds that could be the target compound, from multiple standard mass spectra stored in the spectrum library 28. The selection may be made based on designation by the operator through the input section 3. The retention time tr corresponding to the target compound to be identified may be obtained from the TIC or an extracted ion chromatogram of the monitoring ions of the target compound, and a compound, in the multiple compounds stored in the spectrum library 28, with the retention time within a predetermined allowable range relative to the retention time tr, may be extracted. Then, a standard spectrum of the extracted compound may be acquired. This may result in one or a plurality of standard mass spectra of the candidate compound(s) obtained. Here, a retention index may be used instead of the retention time.

The spectrum similarity calculation section 27 sequentially compares the one or a plurality of standard mass spectra selected from the spectrum library 28 one by one with the original mass spectrum and each difference mass spectrum, to calculate each similarity reflecting how similar one is to the other in the spectrum shape The similarity may be calculated by a method that is the same as that used in the compound identification through conventional library search.

When there are three difference mass spectra as illustrated in FIG. 3C, four similarities of the three difference mass spectra and the original mass spectrum are calculated for the standard mass spectrum of each candidate compound, and thus four similarities S1, S2, S3, and S4 are obtained as illustrated in FIG. 3D. When there are further candidate compounds, a plurality (four in the example described above) of similarities are calculated for the standard mass spectrum of each of the further candidate compounds.

Then, the compound identification section 29 performs the compound identification by referring to the plurality of similarities calculated. Specifically, if there is only one candidate compound, one with the maximum value is picked up from all the similarities calculated, and whether the value of the highest similarity exceeds a predetermined threshold is determined. If the predetermined threshold is exceeded, the single candidate compound corresponding to the standard mass spectrum is identified as the target compound, and if not, the result of the identification may be determined as unidentifiable (or low identification reliability). If there are a plurality of candidate compounds, one with the maximum value is picked up from all the similarities calculated, and whether the value of the highest similarity exceeds a predetermined threshold is determined. If the predetermined threshold is exceeded, the candidate compound corresponding to the standard mass spectrum with the highest similarity is identified as the target compound. Of course, if the highest similarity does not exceed the predetermined threshold, the result of the identification may be determined as unidentifiable (or low identification reliability) also in this case.

When the compound is successfully identified in the manner described above, the compound identification section 29 displays the identification result on the screen of the display section 4. When it is determined unidentifiable, such a result is displayed.

As described above, the GC-MS according to the present embodiment can perform compound identification based on a result of subtracting the background spectrum obtained under the most appropriate background acquisition condition from the original spectrum automatically, without the need for the operator to go through cumbersome operations of visually checking the TIC and manually designating an appropriate background acquisition condition.

In the description above, the spectrum similarity calculation section 27 not only calculates the similarity between the difference mass spectrum and the standard mass spectrum but also calculates the similarity between the original mass spectrum and the standard mass spectrum, to be referred to by the compound identification section 29 for performing the compound identification. This can be modified so that the similarity between the original mass spectrum and the standard mass spectrum is not used for the compound identification.

Next, a GC-MS according to another embodiment featuring data processing slightly different from that of the GC- MS according to the embodiment described above is described with reference to FIG. 4.

Figure 4:
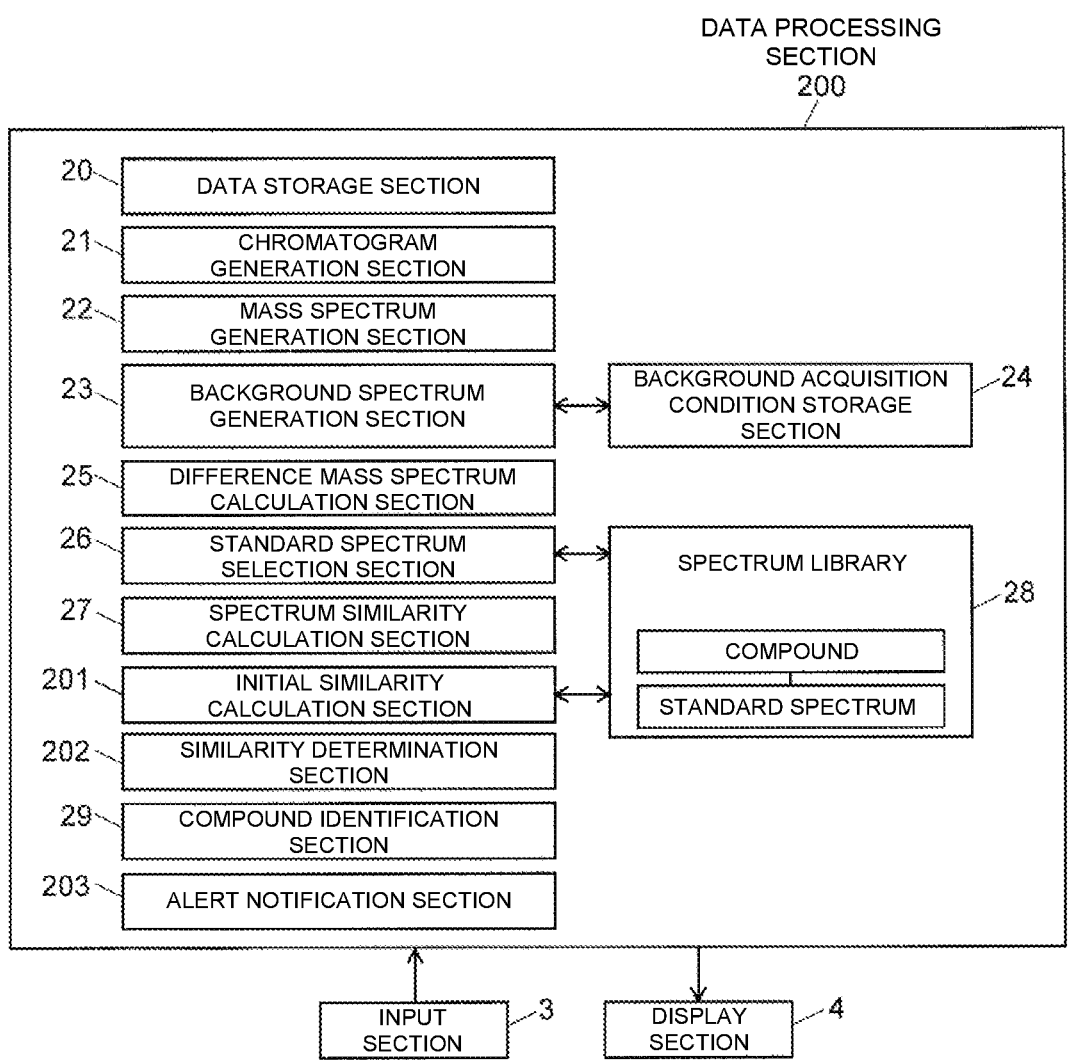
FIG. 4 is a diagram illustrating a configuration of a main part of another embodiment of a GC-MS using a spectrum data processing device according to the present invention.

FIG. 4 is a functional block diagram of a data processing section 200 in the GC-MS according to the present embodiment. The GC-MS has the measurement section 1 that is the same as that in the embodiment illustrated in FIG. 1. Components in FIG. 4 with the same reference numerals in FIG. 1 has basically the same configurations as the counterparts. The GC-MS of this embodiment includes a data processing section 200 including the components of the data processing section 200 of the GC-MS of the above described embodiment, and further includes an initial similarity calculation section 201, a similarity determination section 202, and an alert notification section 203.

In the GC-MS according to the present embodiment, the initial similarity calculation section 201 calculates a similarity between the original mass spectrum of the target peak and each of a plurality of standard mass spectra stored in the spectrum library 28. The similarity determination section 202 compares the level of similarity between the original mass spectrum and a standard mass spectrum with the level of similarity of each of a plurality of difference mass spectra and the same standard mass spectrum. The similarity obtained with the original mass spectrum having a higher level than the similarity obtained with the difference mass spectrum indicates that the background removal compromised the similarity to the standard mass spectrum in the spectrum shape. This means that the background spectrum is not appropriately obtained.

For example, such an incident occurs when another compound is eluded at a high concentration around the starting point of the target peak in a case where the background spectrum is generated under the background acquisition condition [A] described above. Thus, when the similarity obtained with the original mass spectrum has a higher level than the similarity obtained with the difference mass spectrum, the alert notification section 203 displays an alert display indicating that the background acquisition condition might be inappropriate on the screen of the display section 4. The alert display may be displayed together with the identification result of the normal compound identification processing under progress. In response to this alert display, the operator may check the TIC and the like on the screen and may manually set the background acquisition condition as appropriate.

The similarity determination section 202 may determine whether or not the initial similarity between the original mass spectrum a standard spectrum exceeds a predetermined threshold, and determine whether or not the similarities between the same standard spectrum and a plurality of difference mass spectra exceed the predetermined threshold. Then, when the initial similarity exceeding predetermined threshold drops to or below the threshold as a result of the background removal, the alert notification section 203 may display the alert display, indicating that the background acquisition condition might be inappropriate, on the screen of the display section 4.

Such additional processing can avoid erroneous compound identification due to the operator being in charge of an operation and determination in a case where an appropriate background spectrum for performing the background removal fails to be automatically acquired.

Figure 5A:
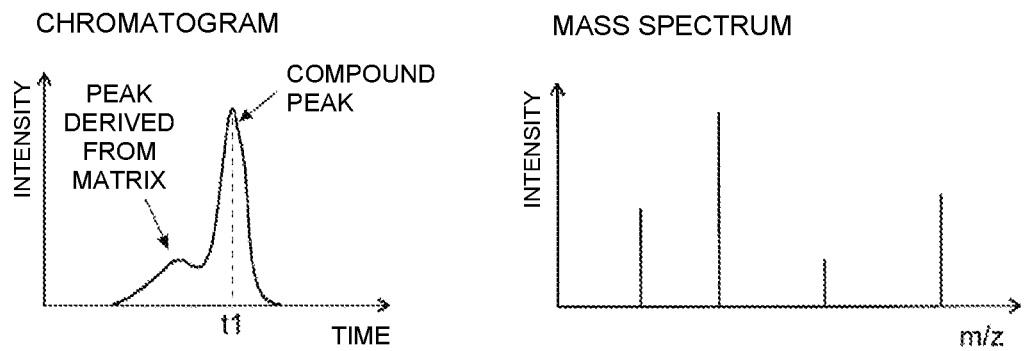
FIGS. 5A-5C are diagrams illustrating background removal processing in a GC-MS according to yet another embodiment.
Figure 5B:
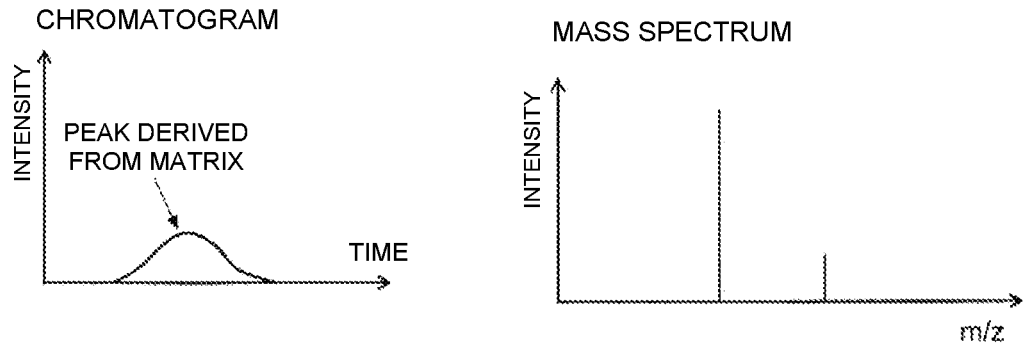
Figure 5C:
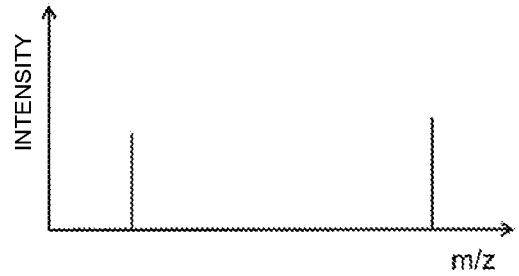

The GC-MS according to the embodiment described above generates a background spectrum by using a part of data obtained by performing GC/MS analysis on a sample including a target compound. Alternatively, the background spectrum may be generated from another type of data that is not derived from the sample. FIGS. 5A-5C are diagrams illustrating an example of a case where subtraction processing is executed with a background spectrum generated from the other type of data. Here, when the TIC is generated based on the data about the target sample with the matrix (main component) of the target sample and the target compound in the sample being close to each other in the retention time, for example, the peak derived from the matrix and the peak of the target compound overlap as illustrated in the left section of FIG. 5A, and the original mass spectrum includes both of the peaks as illustrated in the right section in FIG. 5A.

In such a case, the background spectrum may be generated from data obtained as a result of GC/MS analysis on a blank sample including the matrix only and not including the target compound. In this context, background acquisition conditions set for acquiring such a background spectrum may include using data as a result of the GC/MS analysis on the blank sample and obtaining a mass spectrum in a retention time around the peak top of the peak derived from the matrix. For example, the left section in FIG. 5B illustrates a TIC generated based on data obtained as a result of the GC/MS analysis on the blank sample and the right section in FIG. 5B illustrates the mass spectrum of the peak derived from the matrix in the TIC, that is, the background spectrum. When this background spectrum is subtracted from the original mass spectrum, the mass spectrum peak derived from the spectrum peak is removed so that the peak derived from the target compound mainly remains, resulting in a high similarity to the standard mass spectrum.

The spectrum data processing device according to the present invention is not limited to the processing on the mass spectra data obtained by the GC-MS, and may also be used for compound identification based on mass spectra data obtained by an imaging mass spectrometer for example which involves no combination with GC or LC.

The present invention is not limited to the mass spectra data obtained by the mass spectrometer and may be applied to a case of processing absorption spectra data repeatedly obtained by a PDA detector or a UV detector used in an LC as the detector. Furthermore, the spectrum data processing device according to the present invention may be used for spectrometers in general that identify a compound (or an element) included in a sample through library search using a spectrum, such as a fluorescent X-ray spectrum obtained by a fluorescent X-ray spectrometer.

The embodiments and the modifications described above are merely examples of the present invention, and thus modification, addition, and correction to the embodiments and the modifications without departing from the gist of the present invention are apparently included in the scope of the claims of the present application.

REFERENCE SIGNS LIST

1 . . . Measurement Section
11 . . . Gas Chromatograph (GC) Section
12 . . . Mass Spectrometry (MS) Section
2, 200 . . . Data Processing Section
20 . . . Data Storage Section
21 . . . Chromatogram Generation Section
22 . . . Mass Spectrum Generation Section
23 . . . Background Spectrum Generation Section
24 . . . Background Acquisition Condition Storage Section
25 . . . Difference Mass Spectrum Calculation Section
26 . . . Standard Spectrum Selection Section
27 . . . Spectrum Similarity Calculation Section
28 . . . Spectrum Library 29 . . . Compound Identification Section
201 . . . Initial Similarity Calculation Section
202 . . . Similarity Determination Section
203 . . . Alert Notification Section
3 . . . Input Section
4 . . . Display Section

The invention claimed is:

1. A spectrum data processing device that processes spectra data obtained by performing predetermined analysis on a target sample including a target compound which is a target of identification based on the spectra data obtained for the target sample, the spectrum data processing device comprising:
   a memory in which a spectrum library having a plurality of standard spectra is stored; and
   a processor configured to:
   generate an original spectrum of the target compound;
   acquire a plurality of background spectra each corresponding to a spectrum derived from a compound other than the target compound in accordance with a plurality of background acquisition conditions determined in advance;
   calculate a plurality of difference spectra, each difference spectrum of the plurality of difference spectra being obtained by subtracting each background spectrum of the plurality of background spectra from the original spectrum;
   calculate similarities between each of the plurality of difference spectra and at least one of the plurality of standard spectra stored in the spectrum library;
   set, from the at least one of the plurality of standard spectra used to calculate the similarities, the standard spectra with a highest value in the similarities, as a candidate compound;
   determine whether the highest value in the similarities exceeds a predetermined threshold; and
   identify the target compound as the candidate compound if the highest value in the similarities exceeds the predetermined threshold.

2. The spectrum data processing device according to claim 1, wherein the processor is further configured to:
   calculate an initial similarity between the original spectrum and the at least one of the plurality of standard spectra stored in the spectrum library;
   determine whether each of the similarities for each of the plurality of difference spectra is smaller than the initial similarity, the similarities and the initial similarity being calculated using a same one of the at least one of the plurality of standard spectra; and
   issue an alert to an operator, when at least one of the similarities of the plurality of difference spectra is smaller than the initial similarity, the similarities and the initial similarity being calculated using the same one of the at least one of the plurality of standard spectra.

3. The spectrum data processing device according to claim 1, wherein the processor is further configured to:
   calculate an initial similarity between the original spectrum and the at least one of the plurality of standard spectra stored in the spectrum library;
   determine whether the initial similarity exceeds a predetermined threshold;
   determine whether each of the similarities for each of the plurality of difference spectra exceeds the predetermined threshold; and
   issue an alert to an operator, when the initial similarity exceeds the predetermined threshold and each of the similarities does not exceed the predetermined threshold, the similarities and the initial similarity being calculated using a same one of the at least one of the plurality of standard spectra.

4. The spectrum data processing device according to claim 1, wherein the spectra data that is a target of processing is mass spectra data repeatedly acquired over time through chromatograph mass spectrometry.

5. The spectrum data processing device according to claim 1, wherein the processor is further configured to:
   store compound information about each standard spectrum including (i) a retention time, (ii) a retention index, (iii) a qualifier ion ratio, or (iv) a mass-to-charge ratio of a monitoring ion including a target ion or a qualifier ion, or mixtures thereof; and
   automatically select the at least one of the plurality of standard spectra used for similarity calculation, through narrowing down using one or a plurality of pieces of the compound information.

* * * * *